United States Patent [19]

Malinowski et al.

[11] Patent Number: 4,837,431
[45] Date of Patent: Jun. 6, 1989

[54] VARIABLE PHASE TIME DELAY AND SIGNAL AGGREGATION SYSTEM AND METHOD FOR ACHIEVING CONSTANT SPATIAL RESOLUTION IN SCANNING DETECTION INSTRUMENTS

[75] Inventors: Frank R. Malinowski, Santa Barbara; Thomas S. Pagano, Goleta, both of Calif.

[73] Assignee: Santa Barbara Research Center, Goleta, Calif.

[21] Appl. No.: 83,600

[22] Filed: Aug. 7, 1987

[51] Int. Cl.$^4$ ............................ H01J 3/14; H04N 7/18
[52] U.S. Cl. ........................................ 250/235; 250/236; 250/334; 358/109
[58] Field of Search ............... 250/236, 235, 234, 334, 250/347, 203 R, 578; 356/216; 358/109, 292, 293, 213.26, 213.31; 244/3.16; 350/6.1, 6.5, 6.6, 6.7, 6.8

[56] References Cited

U.S. PATENT DOCUMENTS

| | | | |
|---|---|---|---|
| 4,280,141 | 7/1981 | McCann et al. | 358/109 |
| 4,327,377 | 4/1982 | Takken | 250/334 |
| 4,584,611 | 4/1986 | Katahira | 358/293 |
| 4,593,317 | 6/1986 | Heydlauff | 358/109 |
| 4,675,532 | 6/1987 | Carson | 250/334 |
| 4,728,804 | 3/1988 | Norsworthy | 250/334 |

FOREIGN PATENT DOCUMENTS 0204428 12/1982 Japan ..................... 356/216

OTHER PUBLICATIONS

Burton, "Electronic Solid State Wide Angle Camera System-Esswacs", Proceedings of the Society of Photo-optical Instrumentation Engineers vol. 101, 4/77, pp. 10–19.

Kostishack et al. "Continuous-scan Charge-Coupled Device (CCD) Sensor System with Moving Target Indicator (MTI) for Satellite Surveillance" SPIE vol. 252 Smart Sensors II, 1980, pp. 44–53.

Primary Examiner—David C. Nelms
Assistant Examiner—Michael Messinger
Attorney, Agent, or Firm—W. C. Schubert; V. G. Laslo; A. W. Karambelas

[57] ABSTRACT

A variable phase time delay and signal aggregation ssystem is disclosed. The invention is adapted for use in scanning detection system and serves to maintain spatial resolution on a target surface independent of scan angle. The invention includes means for detecting electromagnetic signals from the surface area. The detector means includes a plurality of detector elements. Each detector element generates a corresponding first plurality of output signals representative of the response of the detector to energy received from the surface area within the field of view of the detector as the detection system scans through a predetermined range. Control means are included for selectively clocking the output signals from the detector elements to phase the relative timing thereof as a function of the scan angle. Means are included to aggregate these signals to generate a combined output signal having the predetermined spatial resolution.

12 Claims, 5 Drawing Sheets

VARIABLE PHASE TIME DELAY AND SIGNAL AGGREGATION SYSTEM AND METHOD FOR ACHIEVING CONSTANT SPATIAL RESOLUTION IN SCANNING DETECTION INSTRUMENTS

BACKGROUND OF THE INVENTION

1. Field of the Invention

This invention relates to scanning electro-optical systems. More specifically, the present invention relates to methods and apparatus for the control of the footprint of a scanning beam as the beam scan angle increases.

While the present invention is described herein with reference to illustrative embodiments for particular applications, it should be understood that the invention is not limited thereto. Those of ordinary skill in the art having access to the teachings provided herein will recognize additional modifications, applications and embodiments within the scope thereof.

2. Description of the Related Art

Scanning radiometers and other electro-optical detection instruments typically utilize a detector (or set of detectors) which are adapted to receive radiant energy directly or by reflection from a scan mirror. In angular scanning systems, the scanning mechanism traverses a scan angle on either side of a line in the middle of the angular scanning range. This line is known in the art as the nadir.

At a given scan angle, the field of view of the detector projects a footprint onto the scanned surface which is the instantaneous size of the projected detector image on the surface. In most applications, the scanned surface is either planar or curved in such a way that as the scan angle increases, the area of the footprint increases from a minimum at the nadir to a maximum at a maximum scan angle.

The growth of the footprint as a function of the scan angle inhibits the ability of airborne and satellite borne scanning radiometers to achieve a constant ground spatial resolution at large scan angles off of the nadir. This presents a particular problem in applications where there is a need to examine a fixed area on the scanned surface with a field of view of constant spatial resolution irrespective of scan angle.

One prior approach to the constant footprint problem includes limiting the scan angle to provide a substantially constant field of view close to the nadir. This approach, however, requires more time to cover the same surface area. Accordingly, its slow speed may force other compromises on the system making it undesirable for many applications.

Another approach is embodied in the Defense Meteorological Satellite Program's operational linescan radiometer. The operational linescan radiometer attempted to achieve a constant ground footprint in the scan (and track) direction by changing the size of the instantaneous field of view as a function of scan angle. The operational linescan radiometer used a combination of techniques including switching to smaller detector sizes during the scan and use of rectangular detectors whose instantaneous field of view rotated with the scan. However, the resulting performance was found to be less than optimum. That is, the degree of constant spatial resolution achieved was limited and the radiometric resolution was compromised.

Thus, there is a need in the art for an improved method and apparatus for use in scanning radiometers which would be effective to maintain a constant footprint (i.e., an area of constant spatial resolution) at a target surface at large scan angles off nadir, without limiting the instantaneous field of view of the detector nor the radiometric resolution thereof.

SUMMARY OF THE INVENTION

The need in the art is addressed by the variable phase time delay and signal aggregation system of the present invention. The invention is adapted for use in a scanning detection system and is effective to maintain a substantially constant footprint in the scan direction, at a predetermined spatial resolution, on a target surface, independent of scan angle. The advantageous operation is afforded by providing a plurality of detectors and by selectively phasing the outputs thereof. The effective performance of the host system, particularly the instantaneous field of view and the radiometric resolution, is not compromised by the present invention.

The invention includes means for detecting electromagnetic signals from the surface area. The detector means includes a plurality of detector elements. Each detector element generates a corresponding first plurality of output signals representative of the response of the detector to energy received from the surface area within the field of view of the detector as the detection system scans through a predetermined range. Control means are included for selectively clocking the signals from the detector elements to phase the relative timing thereof as a function of the scan angle. Means are included to aggregate these signals to generate a combined output signal corresponding to the desired spatial resolution.

DESCRIPTION OF THE INVENTION

Figure 1:
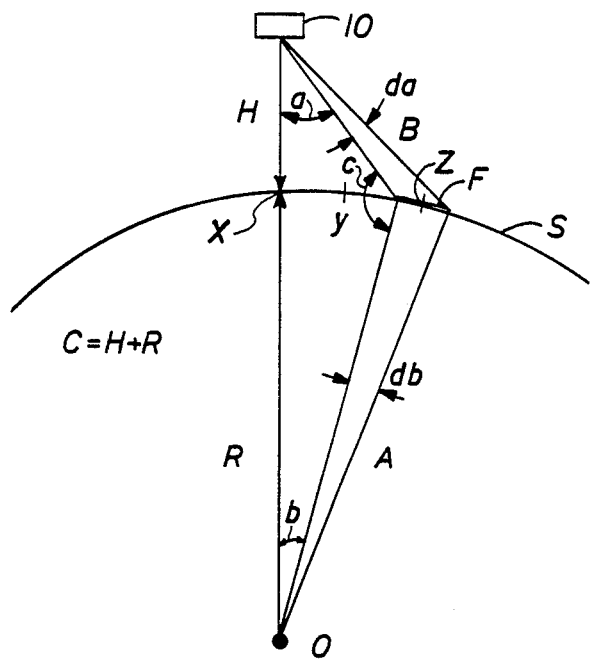
FIG. 1 shows the geometry of a typical operational environment of a radiometer or other electro-optical scanning system in which the present invention may be utilized.

FIG. 1 shows a typical application for a radiometer or other electro-optical angularly scanning detection system 10. Although the invention is disclosed herein with reference to angularly scanning instruments such as scanning radiometers and electro-optical scanners, it is understood that the invention is not limited thereto. Those skilled in the art will recognize that the principles of the present invention, as taught herein, may be extended to other applications as well.

The detection system 10 may be mounted on a satellite or an aircraft (not shown) such that it is positioned at an altitude H above a target surface S of a body having a radius of curvature R. The detection system 10 is typically adapted to scan within a positive and negative scan angle 'a'. The scan angle is measured with respect to a line from the system 10 to the nadir at point 'x' on the surface S. As discussed more fully below, the instantaneous field of view of a detector of the system 10 projects a footprint F onto the surface S which covers a minimum area and provides a maximum spatial resolution at the nadir 'x'. Using the teachings of the related art, the footprint covers a maximum area with minimum spatial resolution at the end of scan position 'z'. The end of scan position 'z' occurs at the maximum scan angle $a_{max}$, which is typically on the order of say 56 degrees. The dimension of the footprint, in the scan direction, may be determined as follows. Since, in general, $$A/\sin a = B/\sin b = C/\sin[1] \quad [1]$$

then $$b = 180 - (c+a) \quad [2]$$

in degrees and $$c = \sin^{-1}((C \times \sin a)/R). \quad [3]$$

Therefore $$b = f(a) = 180 - (\sin^{-1}((H+R)(\sin a)/R) + a) \quad [4]$$

Since the footprint F can be determined by the relation:

$$F = R \times db \quad [5]$$

where db is the angular width of the footprint with respect to the point O, and since $db = (df(a)/da) \times da$, $$F = R \times (df(a)/da) \times da. \quad [6]$$

Substituting and using standard principles yields, $$F = R[((H+R)(\cos a)/R)/[1-((H+R)(\sin a)/R)^2]^{\frac{1}{2}} - 1]da \quad [7]$$

As the ground velocity $V_g$ of the footprint F is:

$$V_g = R \times db/dt = F/dt \quad [8]$$

then $$V_g = R[((H+R)(\cos a)/R)/[1-((H+R)(\sin a)/R)^2]^{\frac{1}{2}} - 1]\dot{a} \quad [9]$$

where $\dot{a} = da/dt$.

Figure 2A:
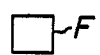
FIG. 2a is representative of the ground projection of the instantaneous field of view (footprint) of a scanning system at nadir.
Figure 2B:
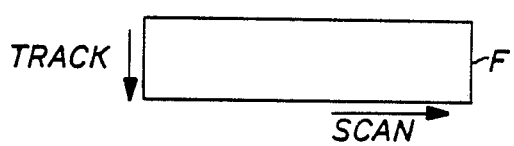
FIG. 2b is representative of the ground projection of the instantaneous field of view of a conventional scanning system at an end-of-scan position.
Figure 2C:
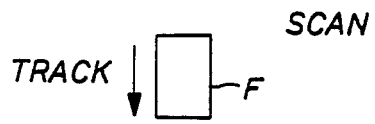
FIG. 2c is representative of the effective ground projection of the instantaneous field of view of a scanning system incorporating the teachings of the present invention.

The typical footprint F at the nadir is illustrated in FIG. 2a. FIG. 2b shows the footprint geometry at the end of scan position where no footprint growth compensation scheme is utilized. Notice the growth of the footprint F in both the scan direction and the track direction. Growth of the footprint F by a factor of approximately six in the scan direction and a factor of approximately 2 in the track direction is not uncommon with typical conventional systems. FIG. 2c shows how the growth of the footprint F in the scan direction is effectively limited by the present invention. As discussed more fully below, the present invention maintains a substantially constant footprint and spatial resolution in the scan direction throughout the scanning range of the system 10.

Figure 3:
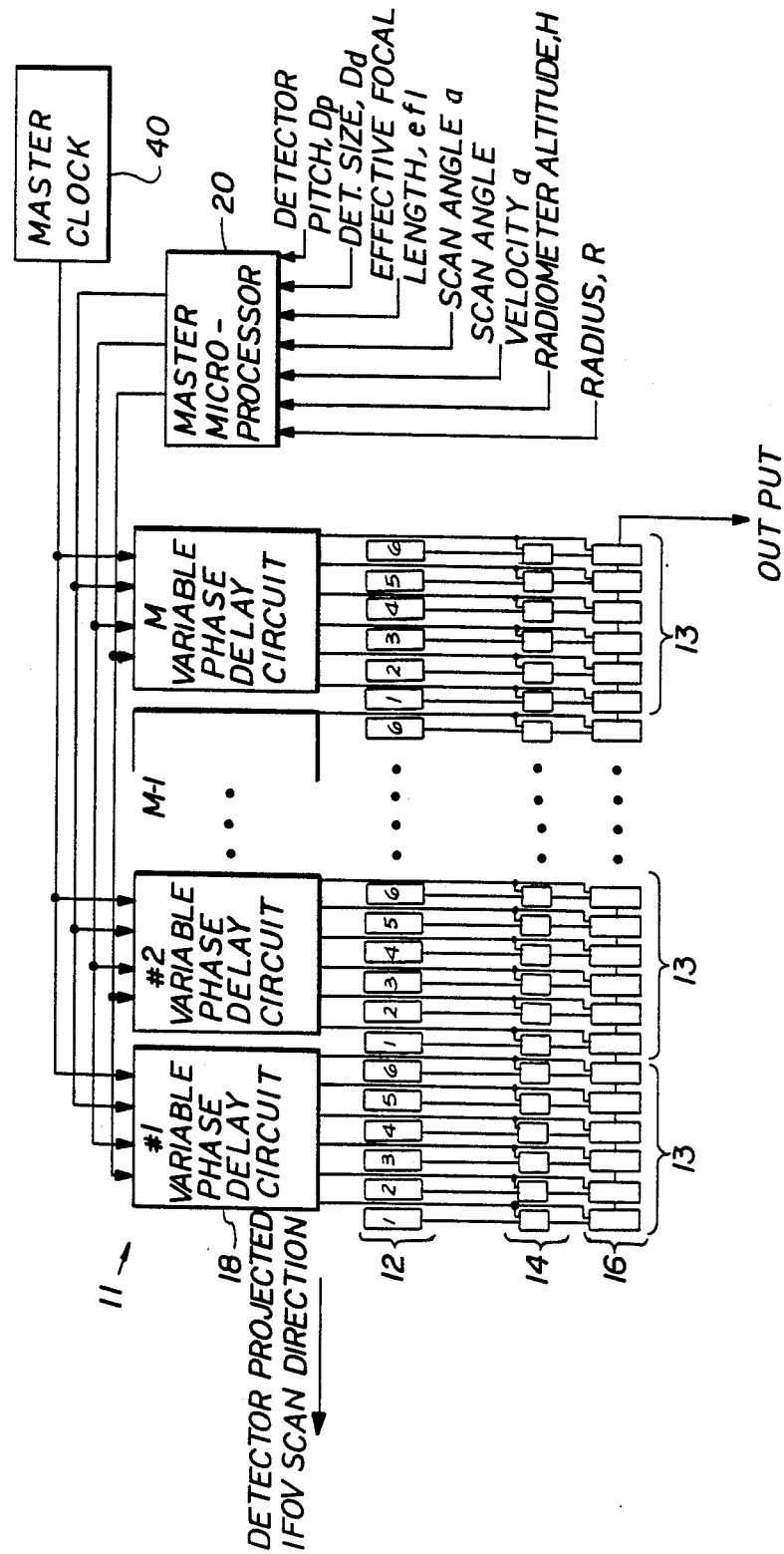
FIG. 3 is a diagrammatic representation of an illustrative embodiment of the variable time delay and signal aggregation system of the present invention.

A block diagram of an illustrative implementation of the advantageous variable phase time delay and signal aggregation system 11 of the present invention is shown in FIG. 3. The embodiment of FIG. 3 features on-plane processing with a monolithic photovoltaic detector and charge coupled device (CCD) arrangement.

The system 11 of the invention includes a linear array of M time delay and integration (TDI) sets 13, numbered 1—M, each TDI set including a linear array of photovoltaic detectors 12, numbered 1–6; six corresponding charge coupled devices 14, one for each detector; a second set of six charge coupled devices 16 one for each of the charge coupled devices 14; and one variable phase delay circuit 18. Within each TDI set 13, the first set of CCDs 14 serves to accumulate (integrate) the charge generated by the associated photovoltaic detectors 12 during the integration time period, while the second set 16 aggregates these accumulated charge packets, appropriately delayed, to provide for the constant spatial resolution for each of the M TDI sets 13. The second TDI set 16 also serves to improve the radiometric resolution of the system by summing the aggregated charge sets, appropriately delayed, from each of the M TDI sets 13. The number of detector elements within a set and the number of sets of detector elements are chosen with respect to the resolution requirements of a particular application and are not critical to the invention. However, the invention does contemplate the use of plural detector elements within at least one set. The invention is described below with respect to one of the M identical time delay and integration sets.

The number, size and pitch of the detectors are chosen to provide a desired footprint at the nadir. The system 10 provides for the scanning of the detectors 12 or for the incident electromagnetic radiation to be reflected onto a fixed array of detector elements by a scanning mirror (not shown) in a manner well known in the art. The detector elements 12 are each mounted to receive electromagnetic radiation within an instantaneous field of view and to provide an output as the system 10 scans the target area in the in-scan direction.

The output of each detector element 12 is stored in an associated charge coupled device in a first bank of charge coupled devices 14. The first bank of CCDs 14 integrate the outputs of the detector elements 12 and hold a resultant charge for transfer to a second bank of CCDs 16 on receipt of a clock pulse from a variable phase delay circuit 18.

As discussed below, for each time delay and integration set 13, a variable phase delay circuit 18 is provided which generates clock pulses, with a predetermined relative phase relationship, for the transfer of accumulated charge from a CCD in the first bank of CCDs 14 to a CCD in the second bank of CCDs 16. The variable phase delay circuits 18 may be implemented with microprocessors or with digital or analog circuitry as is known in the art. In the preferred embodiment, the variable phase delay circuits re implemented with microprocessors. The variable phase delay circuit 18 receives phase delay parameters from a master microprocessor 20 and utilizes a master clock timing signal, provided by a master clock 40, to generate the relative time delay $t_{DL/K}$ of the $K^{th}$ clocking signal where, K is the number of a detector element within a TDI set 13. That is, the microprocessor 20 calculates and provides: the dwell time of the projected detector pitch $t_p$ for the IFOV, the dwell time of the projected detector element $t_d$ for the IFOV, and the time $t_{INTG}$ required for the system line-of-sight to scan the width of a predetermined ground area, at all scan angles. Thus, the microprocessor 20 performs the following calculations:

$$t_d = D_d/(\text{efl} \times \dot{a}) \quad [10]$$

$$t_p = D_p/(\text{efl} \times \dot{a}) \quad [11]$$

and $$t_{INTG} = L/V_g \quad [12]$$

where
$D_d$ is the detector size dimension in the scan direction,
$D_p$ is the detector pitch dimension in the scan direction (the length between detector centers),
efl is the effective focal length,
'a' is the scan angle,
'$\dot{a}$' is the scan angle velocity,
L is the desired ground footprint dimension in the scan direction and
$V_g$ is the ground velocity of the line-of sight of the system 10 as determined by equation [9] above.

Figure 4A:
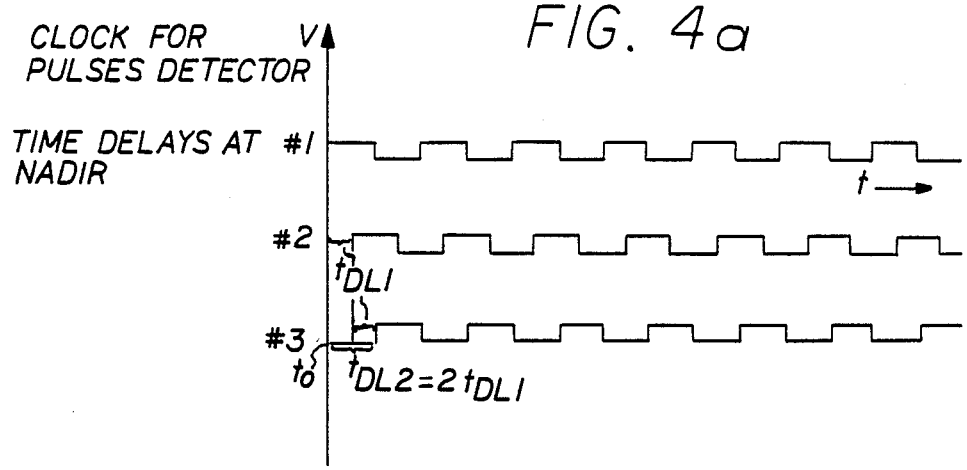
FIGS. 4a, 4b, and 4c show illustrative clock pulses for a subset of three detectors and the relative time delays therebetween as provided by the present invention at nadir, an intermediate position and at an end-of-scan position respectively.
Figure 4B:
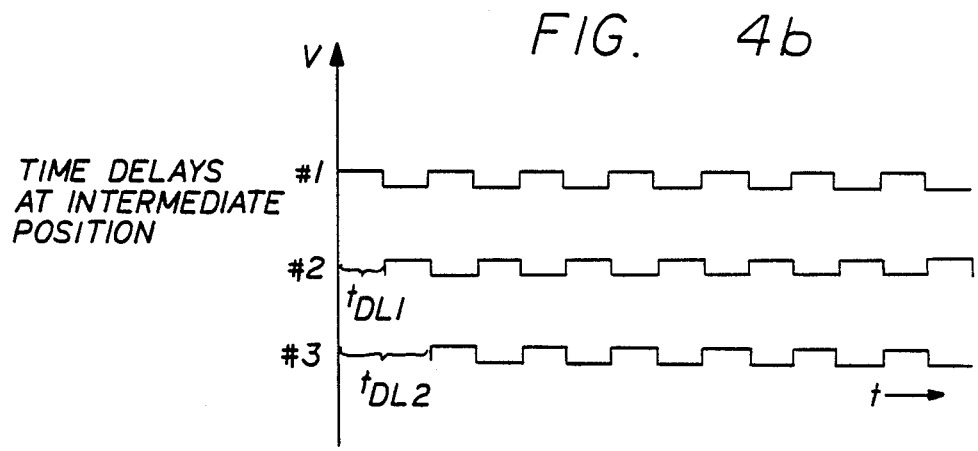
Figure 4C:
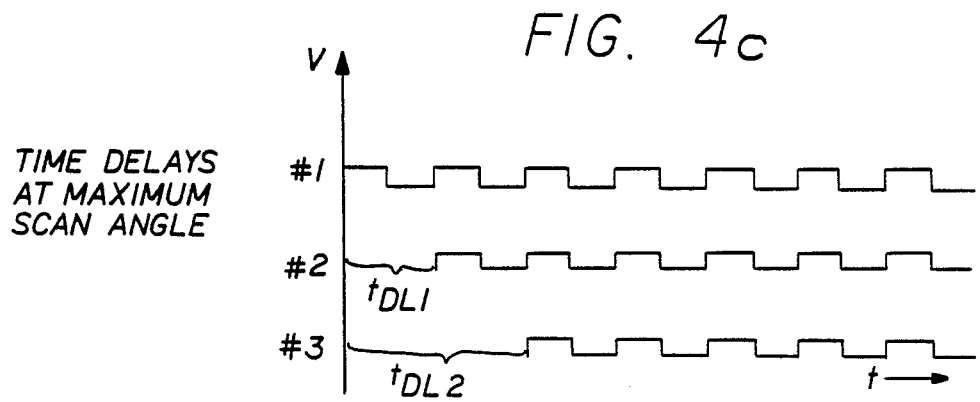

In a typical system, the detector size $D_d$, pitch $D_p$ and effective focal length efl are known. The scan angle may be provided by an angle resolver as is known in the art. As the altitude H and the radius of the body being scanned are also typically known, the master microprocessor 20 can supply the parameters $t_d$, $t_p$, and $t_{INTG}$ to the variable phase delay circuit 18 so that it may calculate the relative phase delays $t_{DL/K}$ of the detector elements within a TDI set to maintain a constant footprint F. Thus, within a given TDI set, the variable phase delay circuit 18 performs the following calculation:

$$t_{DL/K} = (K-1)(t_p - (t_{INTG} - t_d)/(N-1)) \quad [13]$$

where N is the number of detector elements within the TDI set. FIGS. 4a, 4b, and 4c illustrate the timing relationships of the clock pulses associated with the first three detectors of a TDI set at the nadir, an intermediate scan angle, and at the end of scan position respectively. Note that the time between pulses will be related to the integration time $t_{INTG}$ and will therefore be constant so long as $t_{INTG}$ is constant. Note also that the phase delay $t_{DL/K}$ is constant at a given scan angle and varies as a function of the scan angle in the manner described above.

The clock pulses supplied by the variable phase delay circuit control: (1) the time delay and integration time periods calculated according to equations [12] and [13] respectively; (2) the transfer of charge from the Kth detector 12 into its first associated CCD 14 during each integration time period; and (3) the subsequent transfer of accumulated charge in the first CCD 14 through its second CCD 16 (plus charge previously deposited in the second CCD 16 from the $(K-1)^{th}$ associated second CCD 16) into the $(K+1)^{th}$ associated second CCD 16. Thus, the phased integrated detected signals are combined into a single output signal by the aggregation process provided by the second set of CCDs 16.

As illustrated in FIG. 3, M time delay and integration sets 13 may be employed to improve the signal-to-noise ratio (or the NEDT) of the system 10. Equation [14] below is utilized by the M variable phase delay circuits 18 to provide for the proper timing or phasing of the multiple TDI sets 13 of FIG. 3.

$$t_{DL/K,M} = N(M-1)t_p + (K-1)(t_p - (t_{INTG} - t_d)/(N-1)) \quad [14]$$

where $N(M-1)t_p$ represents the time delay between TDI sets 13.

The following should be noted:
(1) The size of a detector in the scan direction should be such that its projected angular instantaneous field of view does not exceed the required ground spatial resolution or footprint at the maximum required scan angle.
(2) A constant detector size and detector pitch should be used in the linear detector array in the radiometer scan direction.
(3) While any number of detectors may be used in the first level of time delay and integration, the optimum number is that which, when multiplied by the projected IFOV size of a single detector element at the nadir scan angle results in a product equal to the required footprint size.

Figure 5A:
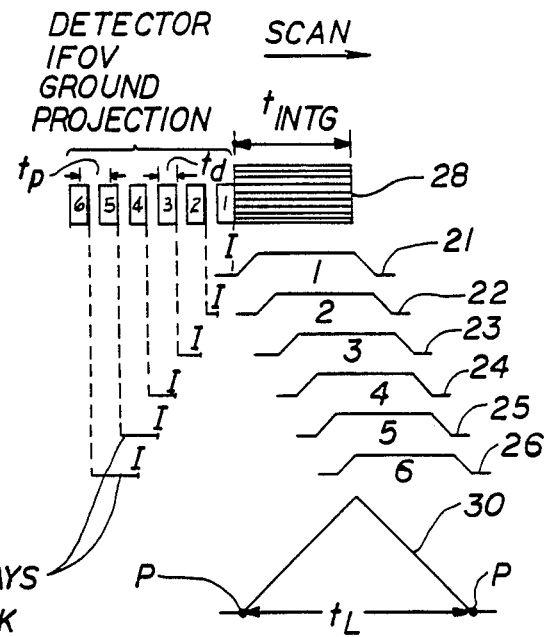
FIGS. 5a, 5b, and 5c show illustrative detector footprints, corresponding phased detected signal outputs, and the shape of a resultant combined output signal at nadir, end-of-scan, and at an intermediate position respectively.
Figure 5B:
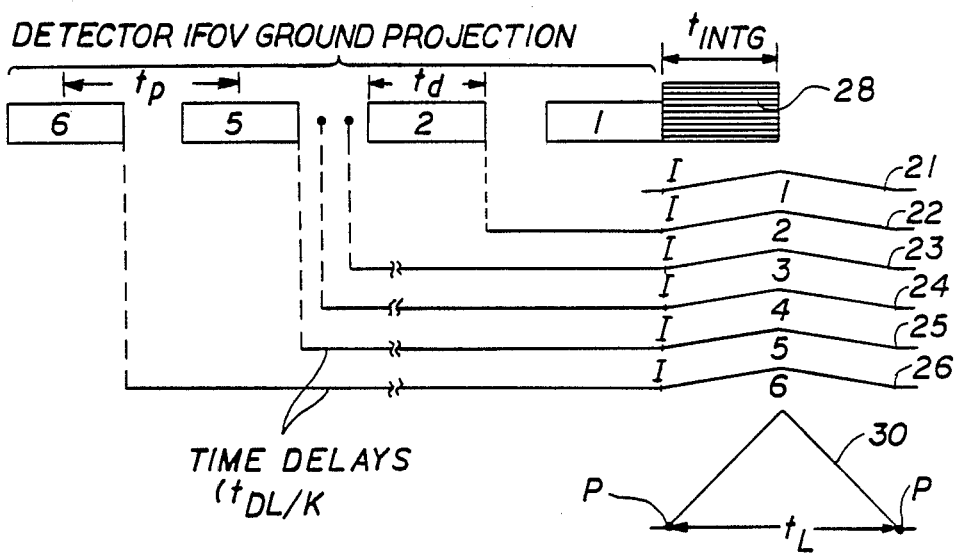
Figure 5C:
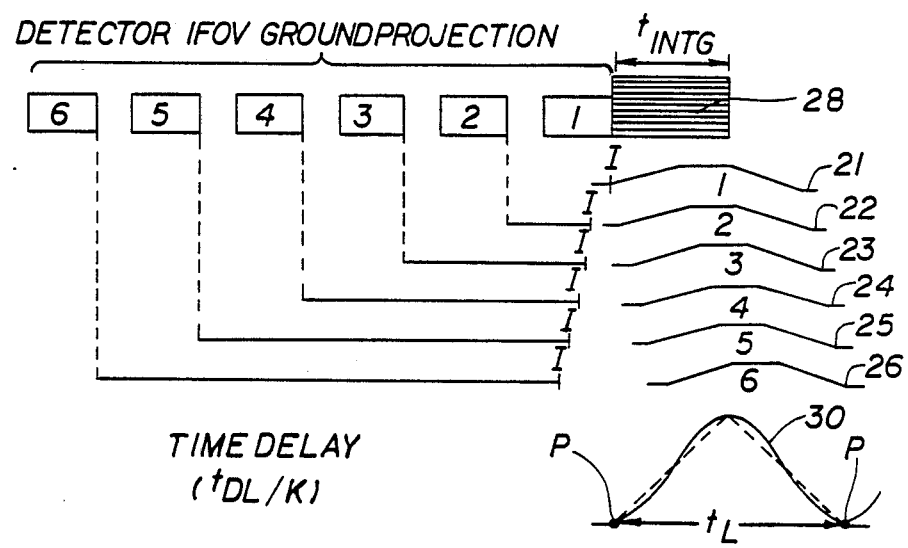

FIGS. 5a–5c illustrate how a constant footprint is maintained by the variable phased time delay and integration circuit 11 of the present invention for scan angles at the nadir, at the maximum scan angle (end of scan), and at an intermediate position respectively. These figures show the footprint of the each of the six detectors 12, of the illustrative embodiment of FIG. 3, within a TDI set 13, which combine to provide the detector IFOV ground projection which corresponds to the required ground spatial resolution. Also shown is the signal response of each of the 6 detectors 12 as it views a ground target 28, of length L in the scan direction. The detector signals, in an illustrative analog format, are shown with the appropriate time delay in accordance with equation [13]. Finally, each figure shows the resultant summed signal 30. The summed signal is shown in analog format for the purpose of illustration. The summation actually occurs after the integration process as discussed above. Those of ordinary skill in the art will recognize that an output signal which has a triangular waveform and a base width exactly equal to twice that of a ground target represents the signature that would result when a projected IFOV of uniform amplitude scans (is convolved with) a ground target of exactly the same size.

At the nadir position of FIG. 5a, as the detector elements 12 scan from left to right over the ground target such that the footprint of the first detector 1 scans the target 28 the analog output signal 21 corresponding of the first detector increases as shown to a plateau which is maintained until the end of the target scan time $t_{INTG}$ at which time it begins to decay. As mentioned above, the subsequent detector output signals are delayed relative to the first in accordance with equation [13] such that signals 22–26 are created by detectors 2–6. At this nadir position, equation [13] merely compensates for the separation between the detector elements. The summed signal 30 is triangular in shape and has a base width time dimension $t_L$ that is equal to twice that of the ground target size $t_{INTG}$ and therefore duplicates the waveform signature that results when a projected IFOV of uniform amplitude scans a ground target of exactly the same size.

Now consider the end-of-scan position of FIG. 5b. Note that in accordance with the teachings of the present invention, the projected IFOV of each detector at the end-of-scan position is equal in size in the scan direction to the required ground spatial resolution, viz., the footprint at nadir. Note also that the projected IFOV at nadir is shown as one-sixth of that at the end-of-scan. Hence, the optimum number of detectors, 6, for the illustrative embodiment is used in the first level of TDI. The detector pitch shown is 1.5 times the detector size.

Most importantly, note that at the end-of-scan position of FIG. 5b, while the size of the detector footprints have grown and the spacing therebetween has grown such that the combined detector IFOV ground projection has grown and while the detector outputs have changed, the triangular waveform signature of the summed signal 30 has not changed. Thus, the effective footprint of the system has not changed.

It can be seen in FIG. 5c, that at an intermediate position between nadir and the maximum scan angle, that the distance between the base points P is the same as the nadir and end-of-scan cases, and that only a small deviation from the triangular waveform exists. The fact that the base width of the summed signal is equal to those of the nadir and end-of-scan positions confirms that the effective footprint size at this position is the same as the nadir and end-of-scan positions. The deviation from the triangular waveform means only that the amplitude of the effective footprint is not uniform over its width at this position.

Thus, the advantageous method of the present invention provides for the use of a plurality of detector elements to cover a target area at nadir. The outputs of the detectors are phased delayed and combined, in the manner discussed above, to provide a predetermined or constant footprint throughout the scan.

The invention has been described herein with reference to an illustrative embodiment for a particular application. Those of ordinary skill in the art and access to the teachings provided herein will recognize additional modifications, applications and embodiments within the scope thereof. For example, as mentioned above, the invention is not limited to any particular application, scanning technique, nor number, size, shape, pitch or type of detectors used. For example, the invention may be used in any application where it is desirable to maintain a constant footprint during a scanning operation. Nor is the invention limited to any scheme used to transfer or to combine the detector outputs. It will be appreciated by those skilled in the art that in place of the photovoltaic detection scheme of the present invention, a hybrid detector array with a CCD architecture or photoconductive or nonsolid state devices may be used. It will also be understood that the teachings of the present invention may be employed to provide for scanning on both sides of nadir by one of ordinary skill in the art.

It is therefore intended by the appended claims to cover any and all such modifications, applications, and embodiments within the scope of the invention.

Accordingly,

What is claimed is:

1. A variable phase time delay and signal aggregation system for use in a scanning detection system and effective to maintain a predetermined spatial resolution on a target surface independent of scan angle, said system comprising:
   detector means for detecting electromagnetic signals from said surface area, said detector means including a plurality of detector elements, each detector element generating a corresponding first plurality of output signals representative of the response of the detector element to energy received from said surface area within the field of view of the detector element as said detection system scans through a predetermined range;
   control means for selectively clocking the first plurality of output signals from the detector elements to phase the relative timing thereof as a function of the scan angle; and
   means for aggregating said first plurality of output signals to provide a combined output signal corresponding to said predetermined spatial resolution.

2. The invention of claim 1 wherein said control means includes means for determining the time required for the scanning system to scan a predetermined target area on said surface.

3. The invention of claim 2 wherein said control means further includes means for determining the dwell time of the projected field of view of a detector element.

4. The invention of claim 3 wherein said control means includes means for determining the dwell time of the distance between centers of the projected field of view of the detector elements.

5. The invention of claim 4 wherein said control means includes means for determining a variable relative time delay between signals for activating each of said detector elements as a function of time required for the scanning system to scan a predetermined target area on said surface; the dwell time of the projected field of view of a detector element; and the dwell time of the distance between centers of the projected field of view of the detector elements to provide a predetermined projected field of view of said detecting means.

6. The invention of claim 4 wherein said control means includes means for determining a variable relative time delay between signals for activating each of said detector elements as a function of time required for the scanning system to scan a predetermined target area on said surface; the dwell time of the projected field of view of a detector element; and the dwell time of the distance between centers of the projected field of view of the detector elements to provide a constant projected field of view of said detecting means.

7. The invention of claim 6 wherein said means for accumulating said first plurality of output signals to provide a combined output signal corresponding to said predetermined spatial resolution includes a plurality of first means for integrating the outputs of said detector elements, each associated with a corresponding detector element.

8. The invention of claim 7 wherein said plurality of first means for integrating the outputs of said detector elements are charged coupled devices.

9. The invention of claim 7 wherein said plurality of first means for integrating the outputs of said detector elements are clocked by said control means.

10. The invention of claim 9 wherein said means for accumulating said first plurality of output signals to provide a combined output signal corresponding to said predetermined spatial resolution includes a plurality of second means for aggregating the outputs of said detector elements, each associated with a corresponding first means for integrating the outputs of said detector elements are clocked by said control means.

11. The invention of claim 10 wherein said plurality of second means for aggregating the outputs of said detector elements are charge coupled devices.

12. A variable phase time delay and signal aggregation system for use in a scanning detection system and effective to maintain a predetermined spatial resolution on a target surface independent of scan angle, said system comprising:

detector means for detecting electromagnetic signals from said surface area, said detector means including a plurality of detector elements, each detector element generating a corresponding first plurality of output signals representative of the response of the detector element to energy received from said surface area within the field of view of the detector element as said detection system scans through a predetermined range;

control means for selectively clocking the first plurality of output signals from the detector elements to phase the relative timing thereof as a function of the scan angle, said control means including:

means for determining the time required for the scanning system to scan a predetermined target area on said surface, means for determining the dwell time of the projected field of view of a detector element, means for determining the dwell time of the distance between centers of the projected field of view of the detector elements, and means for determining a variable relative time delay between signals for activating each of said detector elements as a function of time required for the scanning system to scan a predetermined target area on said surface; the dwell time of the projected field of view of a detector element; and the dwell time of the distance between centers of the projected field of view of the detector elements to provide a constant projected field of view of said detecting means; and means for aggregating said first plurality of output signals to provide a combined output signal corresponding to said predetermined spatial resolution.

* * * * *